Dec. 16, 1952 L. J. KABELL ET AL 2,622,130
AUTOMATIC CABLE TESTER OR FAULT ANALYZER MEANS
Filed Sept. 26, 1950 4 Sheets-Sheet 1

WITNESSES:
Edward C. Walsh
Louis L. Jacot

INVENTORS:
ALLEN L. DYER, LOUIS J. KABELL
AND RICHARD A. RICHARDS
BY
Roland A. Anderson
Attorney Patented Dec. 16, 1952

2,622,130

UNITED STATES PATENT OFFICE 2,622,130

AUTOMATIC CABLE TESTER OR FAULT ANALYZER MEANS

Louis J. Kabell, Richard A. Richards, and Allen L. Dyer, Albuquerque, N. Mex., assignors to the United States of America as represented by the United States Atomic Energy Commission Application September 26, 1950, Serial No. 186,848

6 Claims. (Cl. 175—183)

The present invention relates to an automatic apparatus for testing or analyzing for faults, a cable having a plurality of wires. The particular characteristics or faults which the apparatus is intended to test or analyze for are conductive integrity of each wire including its end connectors and the insulation resistance between each wire and the remaining wires in the cable which are tied together and grounded. The tester operates to identify any wire having a fault either because of excessive resistance or insulation leakage. The apparatus could, of course, conceivably be set up to indicate other types of faults in the same manner.

The apparatus embodies means so that the wire in which a fault is encountered is indicated on a dial by number and the type of fault is indicated by an indicator or signal lamp.

In many types of modern equipment, particularly for use in aircraft and the like, various types of electrical and other equipment are employed wherein the wiring requires the use of large numbers of cables, each having a substantial number of wires. In order to insure the proper operation of equipment and to insure against faults or defects in the cables which would render the equipment ineffective or inoperative it is essential that the individual wires in each cable be checked, that is, tested for faults. When this is done manually by individually testing each wire with appropriate instruments the operation is, of course, a tedious and time-consuming process and, of course, involves the risk that one or more individual wires may be missed in the testing operations. It is, accordingly, an object of the present invention to provide an automatic testing apparatus whereby cables having a plurality of wires may be automatically tested or analyzed for faults as described above simply by plugging the cable into an adaptor associated with the tester and placing the tester in operation.

Another object of the invention is to provide a cable tester having characteristics as outlined in the foregoing wherein an automatic stepping relay is provided, controlled by a cycling timer, the stepping relay being operatively connected to a plurality of sequentially operated relays which are wired to an adaptor unit into which the ends of a multiple wire cable may be plugged in such a manner that each of the sequentially operated relays is operable to connect an individual wire to a testing device controlled by the cycling timer which analyzes the individual wire for faults by connecting a high voltage source to one end of the wire to check for insulation resistance and then connecting a low voltage source between the ends of the wire to check for continuity.

The system as outlined in the foregoing object may include a signalling device operable to interrupt the operation of the stepping relay and to provide a signal in the event that a fault is encountered in an individual wire.

As pointed out above the tester embodies a cabinet and there is also provided an adaptor unit which fits into a suitable recess in the cabinet, the purpose of the adaptor unit being to adapt the tester for testing various different types of cables having different numbers of wires and having different types of plugs, having varying numbers of connector pins in different geometric patterns. The tester cabinet has within the recess a pair of rectangular contact panels each having a plurality of contacts and the adaptor unit has a pair of similar panels with contacts which engage with the contacts of the cabinet panel when the adaptor unit is in place. The adaptor unit has a front panel carrying a plurality of receptacles adapted to receive plugs at the ends of a cable to be tested and these receptacles may be such as to receive any number and type of plugs as described above. The adaptor unit also carries a selector switch which is wired into the system so that after the last wire in a particular cable has been checked, regardless of the number of wires, the system will recycle and reset itself back to the starting point.

In accordance with the above it is another object of the invention to provide an adaptor unit including a selector switch as set forth in the foregoing.

Further objects and numerous advantages of the invention will become apparent from the following detailed description and annexed drawings, Figure 1 of which is a partial circuit diagram of a preferred form of the invention, showing mainly the stepping relay.

The entire apparatus of the invention is contained within a suitable cabinet having a front panel with the signal devices and indicators mounted thereon. The cable to be tested is plugged into appropriate receptacles in the adaptor unit which fits into the cabinet and the test is begun by pushing a start button. The test then proceeds automatically from wire to wire.

After the start button is pressed a cycling timer takes control of a stepping relay which operates step by step to sequentially energize a group of relays, each of which is associated with an individual wire of the cable to be tested. Upon energization of each of the sequentially operated relays, the cycling timer energizes a change-over relay which momentarily connects the two sources of voltage in the manner described above to the individual wire to test that particular wire. When the next of the sequentially operated relays is energized the cycling timer causes the same tests to be performed on its associated wire.

In the event that a fault is encountered the automatic operation stops and one of the signalling devices indicates the fault and the start button must be again pressed to restart the apparatus.

Figure 1:
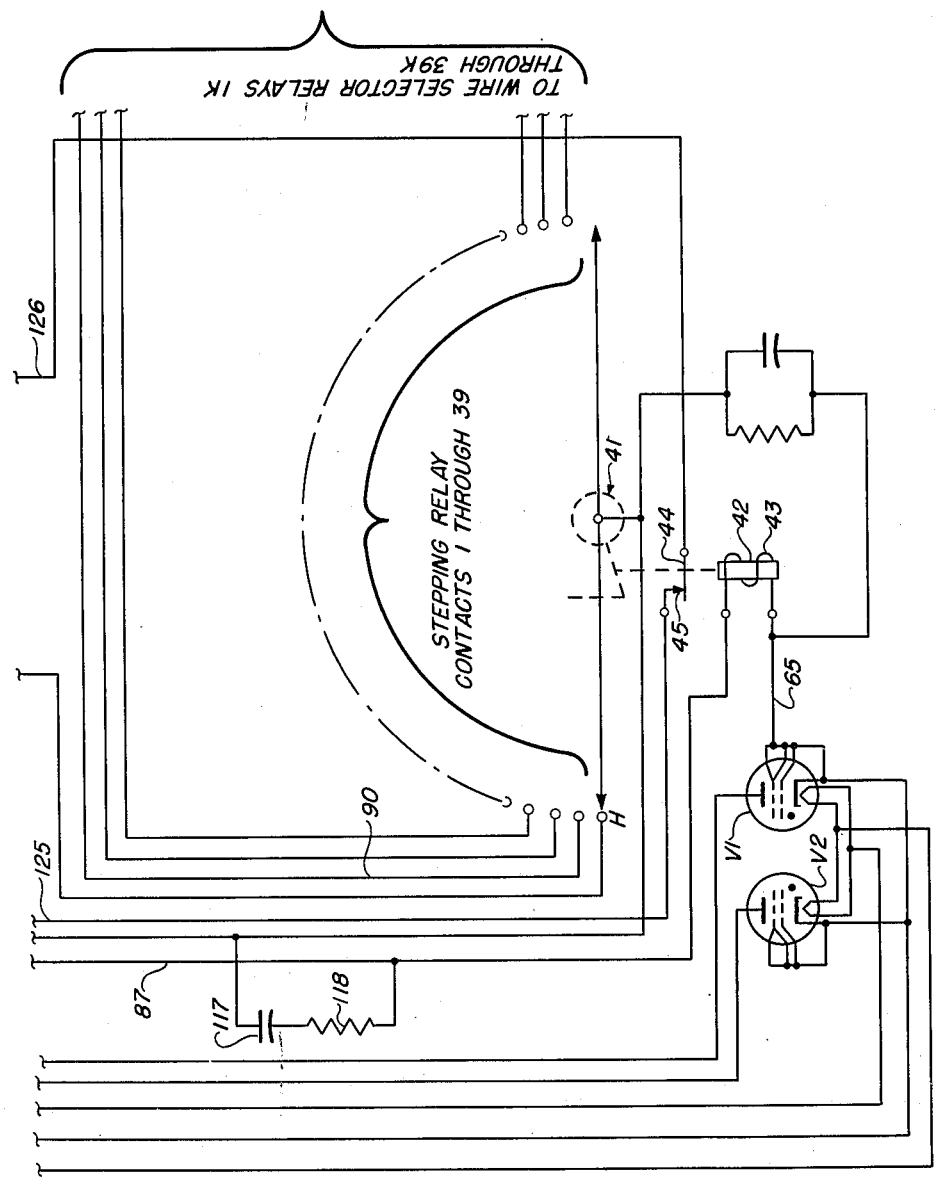

The system of the invention may be said to be built around a stepping relay (Fig. 1) which is a spring acting type of mechanism which automatically steps from one contact to another. The relay of the present invention has contacts numbered from 1 to 39 as shown on Figure 1 and an initial or home position contact as indicated at H. The relay itself is designated by the numeral 41 and it has an armature 42 and a winding 43, the connections between the armature and the contactor mechanism embodying a ratchet such that after the winding has been energized by a pulse of current, upon deenergization the relay steps to the next contact. The ratchet mechanism actuates a double wiper arm as shown. The relay 41 also embodies a switch blade 44 cooperating with a contact 45 which is closed when the relay is de-energized.

The relay 41 during operation is controlled by a cycling timer (Fig. 2) designated generally as 48, this timer comprising a timing motor 49 which drives cams 50, 51 and 52. These cams operate switches 53, 54 and 55 respectively. The motor 49 drives its shaft at a speed of one revolution per second so that the time cycle of the cam operated switches is one cycle per second. The sequence of switch operations is such that the switch 54 is normally closed, the purpose of this switch being for starting synchronization as will be described and this switch is open from .15 second to .25 second during the cycle to begin the operation. Switch 55 closes for .10 second after switch 54 has opened and this switch, that is, switch 55 provides a pulse for stepping the relay 41. The switch 53 is closed from .30 to .65 second during the cycle to provide changeover from one test to the other.

Starting of a test is controlled by a manual starting switch 56 (Fig. 2) which is a push button switch closed by depressing the switch. Switch 56 controls a relay A having the usual winding and armature and blades A1, A2 and A3 cooperating with contacts $a1$, $a2$, $a3$ and $a4$.

The system includes a number of similar relays as designated at B, C, D, E, F and G, these relays having switch blades and contacts designated by a corresponding system of alphabetical characters. The operation of these relays will be referred to more in detail presently.

The relay B is designated as the home position hold-off relay and it is energized when the relay 41 is in home position.

The relay E is designated as the homing relay and it becomes energized after the last wire in the cable has been checked and it causes the system to recycle to home position. Relay E may be manually energized by switch 57 for manual recycling as will be described.

The system also includes a number of wire selector relays (Fig. 3) each of which acts to connect an individual wire for testing and these relays are designated 1K, 2K, 3K, etc. there being one relay for each of the contacts of relay 41 these relays having switch blades and contacts designated by a corresponding system of alphabetical characters.

The characters J1 and J2 (Fig. 3) designate a pair of contact panels in the tester cabinet as referred to above, each having a plurality of contacts, for instance, 42. The first contact of each of these panels is connected to one of the switch blades K1 and K2 respectively of relay 1K. Subsequent contacts of these panels are similarly connected to the relays 2K, 3K, and so on. As pointed out in the foregoing the adaptor unit which will be referred to again presently has contact panels which engage with the panels J1 and J2 when the adaptor unit is in place.

The power supply for the system (Fig. 2) is designated at 58 and there is included a transformer 59 having a primary 60, a 6.3 volt secondary 61, a center tap 220 volt secondary winding 62, and a 110 volt secondary winding 63.

The power supply for the winding 43 of relay 41 (Fig. 1) includes a pair of Thyratron rectifier tubes V1 and V2 having a cathode, plate, grid and screen grid as shown and cathode heaters which are connected in parallel across the 6.3 volt winding 61 as shown. The plates of tubes V1 and V2 are connected across the 220 volt winding 62 as shown. The cathodes of the tubes V1 and V2 are connected together and to one end of the winding 43 by a wire 65 as shown and also to the center tap of the 6.3 V. winding 61. The tubes V1 and V2 operate in the usual manner to provide rectified current for operation of the relay 41.

Numeral 67 (Fig. 2) designates a high voltage power supply of 500 volts, for example, connected with the power supply lines 58, for purposes of making the insulation test.

The relay M is a sensitive type of relay which is a part of the insulation testing circuit and this relay has a winding 69 which becomes energized if the leakage current from the wire being tested becomes high enough. Relay M is of a type having a second winding 70 and armature and if winding 69 becomes energized the relay must be reset by energization of winding 70. Relay M has a switch blade M1 and cooperating contact $m1$.

Figure 4:
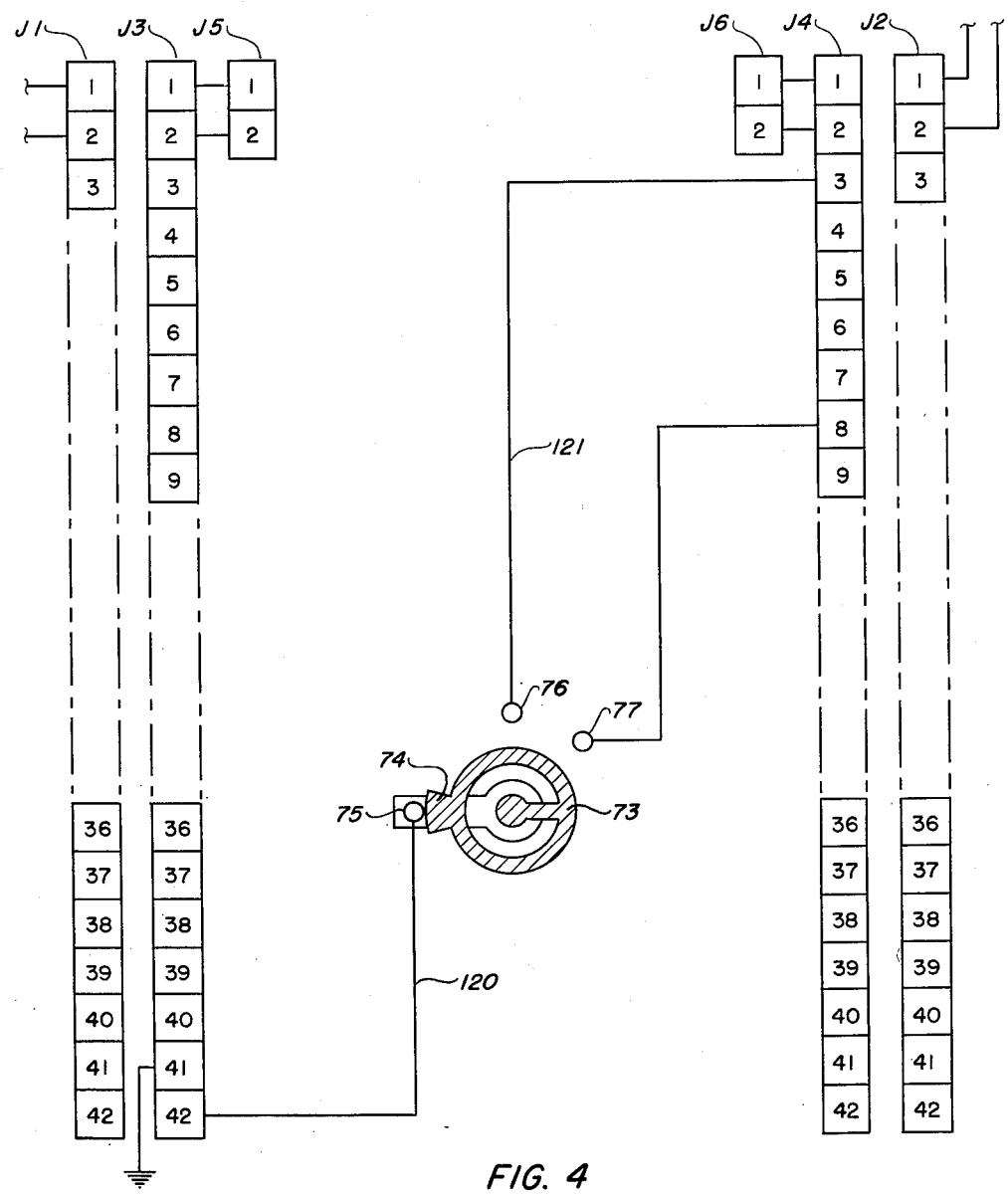
Figure 4 is a schematic diagram illustrating the principle of the adaptor unit and the cable selector switch.

As previously described the adaptor unit fits into a recess in the cabinet of the tester and has contact panels which engage with the panels J1 and J2 in the tester cabinet. On Figure 4 the corresponding contact panels of the adaptor unit are designated as J3 and J4. Figure 4 is a wiring diagram illustrating the principle involved in the wiring between the contact panels J3 and J4 and the various receptacles on the panel of the adaptor unit and the selector switch designated as 73. The selector switch 73 is a rotary type switch having a wiper arm 74 which cooperates with a plurality of contacts 75, 76, and 77, contact 75 being the off position contact. The adaptor unit has corresponding receptacles J5 and J6 as shown and it may have a plurality of similar sets of receptacles adapting it for testing as many different cables. The drawing is merely illustrative in this respect.

As will be explained presently the various contacts of the selector switch 73 are wired to the receptacles on the right hand side in such a way that the system will reset after a pre-determined number of wires has been checked, that is, as will be observed presently if the selector switch 73 is set to its contact 76, for example, the system will reset after two wires have been checked; if it is set to its contact 77 it will reset after seven wires have been checked and so on.

To start operation of a test after a cable has been plugged into the adaptor unit the start switch 56 is depressed which energizes relay A by connecting its winding directly across the 110 volt secondary winding 63 of transformer 59. When relay A is energized it establishes a locking circuit for itself across the winding 63 and through the cam switch 54, via contact $a1$, blade A1, cam switch 54 and thence back to the other side of transformer secondary coil 63. Upon the establishment of this locking circuit the start button 56 can be released, and the locking circuit will continue to hold blade A1 in closed position. The operation does not begin until cam 51 has been rotated by the timing motor 49 to a position to open switch 54 which interrupts the locking circuit for relay A de-energizing this relay. Upon energization of relay A its blade A2 closed against contact $a2$ and connects winding 43 of relay 41 to the 110 volt D. C. power supply which causes this relay to energize and to thereby prepare it for stepping operation. The spring-actuated ratchet mechanism of this relay is such that it steps to its first contact No. 1 upon de-energization of winding 43. The circuit for the winding 43 is from the center tap of transformer secondary winding 62 through wire 85, wire 86, contact $a2$, blade A2, wire 87, winding 43, wire 65, the rectifier tubes V1 and V2, back to the winding 62. When relay A de-energizes as a result of opening of switch 54 by cam 51 its contact $a3$ closes with blade A2 and this prepares a circuit for providing electrical pulses for energizing winding 43 of relay 41 for sequentially stepping this relay to its various positions. This stepping pulse circuit is controlled by cam switch 55, operated by cam 52, and, as will be observed, operation of this switch is synchronized with switch 54 so that the stepping operation does not begin until after cam switch 54 has de-energized relay A. The stepping pulse circuit whereby the relay 41 steps to its various positions will be described presently.

Upon operation of the above described starting synchronization circuit whereby winding 43 was energized and deenergized the relay 41 steps to its number 1 position and through wire 90, which connects with the contact at this number 1 position, relay 1K now becomes energized by having its winding connected across the 110 volt winding 63. This circuit from the winding of relay 1K is through the contact $f1$ and blade F1 of relay F by way of wire 89, wire 94, and wire 93; relay F is in the de-energized position at this time. Contacts $k1$ and $k3$ of relay 1K are connected, respectively, to the poles or blades G2 and G1 of relay G by wires 91 and 92, respectively, so that when relay 1K is energized and poles K1 and K2 are closed against contacts $k1$ and $k3$, respectively, the ends of the first wire to be tested are connected to the poles G2 and G1 of relay G as will be observed. When relay 1K is de-energized one end of the first wire to be tested is connected to ground through resistor 99 and the other end of the first wire to be tested is connected to ground through a resistor 102.

The cycle now continues and the next step in the cycle is the closing of cam switch 53 by cam 50, which energizes relay G for setting up circuits for performing the test as to the leakage resistance of the wire being tested. The circuit for the winding of relay G is from the 110 volt winding 63 through wire 93, wire 94, wire 95, coil of relay G, wire 96, cam switch 53, wire 97, blade B2 and contact $b2$ of relay B and wire 98, back to winding 63. When relay G is thus energized its contacts $g1$ and $g3$ are in closed relationship with blades G2 and G1 and connect both ends of the wire being tested to wire 100 which connects to the 500 volt supply 67 which is in turn connected to the winding 69 of relay M. If the leakage current from the wire being tested becomes high enough winding 69 energizes causing closure of blade M1 against contact $m1$, which thereby establishes a circuit that energizes relay D by connecting its winding across the 110 volt winding 63 (via wire 93, wire 94, blade M1, contact $m1$, coil of relay D, and the return wires back to the other end of the transforming coil 63). With leakage current energizing relay D, blade D2 is closed against contact $d2$. Contact $d2$ of relay D now energizes a signal lamp 101 indicating a fault in that the leakage resistance of the wire being tested is insufficient. (Opening of contact $d1$ upon energization of relay D interrupts the stepping pulse circuit and prevents continued stepping operation of relay 41 as will be described presently.)

When cam switch 53 opens, in response to rotation of cam 50, relay G is de-energized and its contacts $g2$ and $g4$ contact blades G2 and G1 so as to now connect the ends of the wire being tested to the resistor 103, a portion of which is in shunt with the winding of relay C, and to the 6.3 volt winding 61 respectively. This circuit extends from blade G1 through contact $g2$, resistor 103, sliding contact 106, coil of relay C, wire 104, wire 105, transformer coil 61, wire 130, and contact $g4$. Blades G1 and G2 connect with wires 91 and 92 that join with contacts $k3$ and $k1$, respectively, with which the test wire connects by blades K2 and K1. This circuit constitutes the continuity checking circuit. Resistor 103 has a sliding contact 106 providing a means of adjusting the current in the winding of relay C so that it will not energize when a continuity current of less that two amperes flows. If there is lack of continuity as established in this manner relay C will fail to energize causing engagement of its blade C1 and contact $c1$ which lights an indicator lamp 107 indicating lack of continuity. During the testing of individual wires the relay C will periodically energize and de-energize causing flashing of the lamp 107 but this does not indicate a fault; only the fact of lamp 107 coming on, and remaining on, indicates lack of continuity. The stepping pulse circuit extends through the contact $c2$ of relay C and it becomes interrupted upon deenergization of relay C indicating a fault. Thus it will be observed that if either the leakage resistance or continuity checks are negative the stepping pulse circuit is interrupted and continuation of the test is prevented until there has been manual intervention.

The stepping pulse circuit whereby the relay 41 automatically steps from contact to contact for checking individual wires is controlled by the cam switch 55 as pointed out above and this circuit is as follows: from the center tap of winding 62 through wire 85, wire 98, contact b2 of relay B, blade B2, wire 97, wire 110, blade C1 and contact c2 of relay C, wire 111, contact d1 and blade D1 of relay D, wire 112, cam switch 55, wire 113, contact e3 and blade E2 of relay E, wire 114, contact a3 and blade A2 of relay A, wire 87, winding 43 of relay 41, wire 65 and through the rectifier tubes back to the winding 62. It will be observed that connected across the various control contacts of the above described stepping pulse circuit is a series connected condenser 117 and resistor 118, the purpose of which is to reduce arcing across the contacts of switch 55 and contacts a2 and A2 of relay A and contacts 44 and 45 of relay 41. From the foregoing it will be observed that successive closures of the cam switch 55 energize the relay 41 in pulses causing it to step successively from one contact to another and at each contact a corresponding one of the relays 1K, 2K, etc. becomes energized. Should the stepping pulse circuit become interrupted as a result of a check on one of the wires being tested being negative an appropriate indicator lamp comes on as described.

In the event of a negative insulation resistance test causing energization of winding 69 of relay M this relay locks up and must be reset by energization of winding 70. This will come about as a result of the operator's restarting the test by again depressing the push button 56 to energize the relay A; contact a4 of relay A will connect winding 70 across the 110 volt winding 63 and this will reset the relay M.

The relay 41 includes a dial on the front panel of the tester cabinet and this dial is indexed to indicate the number of the defective wire in the cable in the event of a negative check. The number of the wire will be indicated since the relay will stop opposite this number on the dial.

After the last wire in the cable has been checked and found satisfactory the relay 41 will step to its next position and before relay G becomes energized the winding of relay E will be connected across the 6.3 volt winding 61 to energize this relay. This circuit will be through the cable selector switch 73 forming part of the adaptor unit as shown on Figure 4. For example, suppose that a two wire cable has been checked; it will then be desired that when relay 41 steps to number 3 position that relay E will become energized and the system will recycle to home position. In these circumstances, referring to Figure 4, the cable selector switch 73 will be set to its contact 76 which connects to the third contact of the contact panel J4 as shown. The circuit energizing relay E will be from winding 61 through wire 105, through the winding of relay E, wire 119 to contact 42 of panel J1, contact 42 of panel J3 (Fig. 4) wire 120, selector switch 73, contact 76, wire 121, contact 3 of panel J4, contact 3 of panel J2, wire 122, blade 3K2 and contact 3k3 of 3K relay which will be energized at this time, wire 91, blade G2, through the contact g4 of relay G and wire 130 back to the winding 61. When relay E energizes it completes a locking circuit for itself through its contact e1 and contact b1 of relay B. Contact e2 of relay E completes a circuit connecting the winding 43 of relay 41 to the transformer winding 62, this circuit being as follows: from winding 62 through wire 85, wire 98, contact b2 of relay B, wire 125, contact 45 of relay 41, blade 44, wire 126, contact e2 of relay E, blade E2, wire 114, contact a3 of relay A, blade A2, wire 87, winding 43, wire 65 and the rectifier tubes back to winding 62. This circuit causes the relay 41 to be self-stepping under control of contacts 45 and 44 until it reaches home position at which position relay B becomes energized through the contact H of relay 41 and this opens contact b2 which de-energizes the relay E. De-energization of relay E, of course, removes power from the winding 43 of relay 41 and the locking circuit of relay E will be open also at this time. The system is now in an inactive position and is prepared to have another cable plugged into the adaptor for testing. Contact e3 of relay E serves to energize the relay F when relay E is energized, and this opens contact f1 of relay F, which cuts off power from relays 1K, 2K and so on to prevent energization of these relays when the relay 41 is returning to home position.

For convenience, a review of the apparatus will now be given. Assume a multi-conductor cable to be connected between J1 and J2, with the individual conductors of the cable connected between correspondingly number terminals of J1 and J2. This operatively connects a conductor between blades K1 and K2 of each of the wire selector relays, the number of wire selector relays connected being dependent upon the number of wires in the particular cable to be tested. All wire selector relays are generally "at rest" in the normally de-energized relationship shown. In this relationship the blades K1 and K2 connect the corresponding conductor to the common ground bus, through "back" contacts k2 and k4 and isolating resistors 99 and 102, respectively. The resistors 99 and 102 are of such low value as to be insignificant compared with the insulation resistance being tested; therefore, for insulation test purposes both ends of all cable conductors being tested are effectively connected to ground bus 109.

All contacts k1 of each wire selector relay are connected with test bus or wire 92 and all contacts k3 of all wire selector relays are connected with test bus or wire 91.

Test buses or wires 91 and 93 connect to blades G2 and G1 of test change-over relay G. This relay G in de-energized position connects test buses or wires 91 and 92 to the continuity detector circuit through "back" contacts g4 and g2, respectively. When relay G is energized it connects test buses 91 and 92 to the insulation test circuit through blades G2, G1, and "front" contacts g3 and g1, respectively, and conductor 100.

To test any particular conductor of the specimen cable, its corresponding wire selector relay is energized, thereby connecting the particular conductor to be tested between test buses 91 and 92, and disconnecting it from ground. These test buses are connected first to the continuity detector circuit for a period of time, at the end of which they are connected to the insulation test circuit for a period of time. This transfer is effected by energizing relay G for the desired time by cam 50 actuating switch 53.

Figure 3:
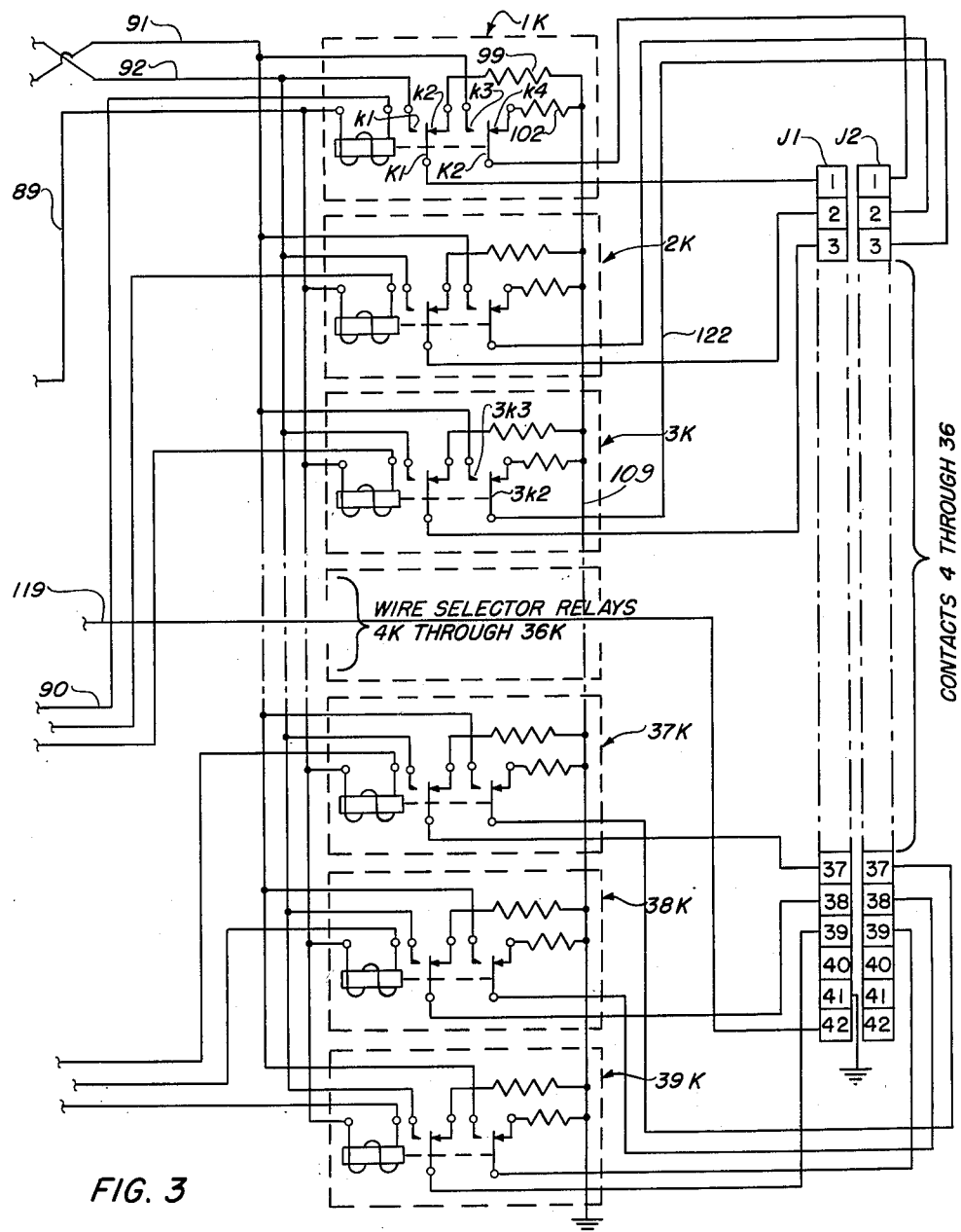
Figure 3 is a further portion of the wiring diagram of Figure 1.

Sequential energization of the wire selector relays of Fig. 3 is effected by means of the stepping relay 41, the stepping of which is in turn periodically controlled by the cam 52 actuating switch 55.

The insulation test circuit may comprise the suitable voltage supply means 67 and a fault current detector, for example, relay M, for eventual application between the test buses 91, 92 and ground.

In the event of an insulation fault, current will flow from the voltage supply 67 through the contacts of change-over relay G when energized, to test buses 91 and/or 92 through contacts k1 and/or k2 of the energized wire selector relay associated with the particular conductor under tests, through the conductor under tests, through its insulation fault, to ground in the event of a direct ground fault, or, in the case of a "cross fault" to other conductors of the specimen cable through that fault, through associated resistors 99 and/or 102 to ground and thence through the fault current detector (relay M as shown herein) back to the voltage supply 67.

Figure 2:
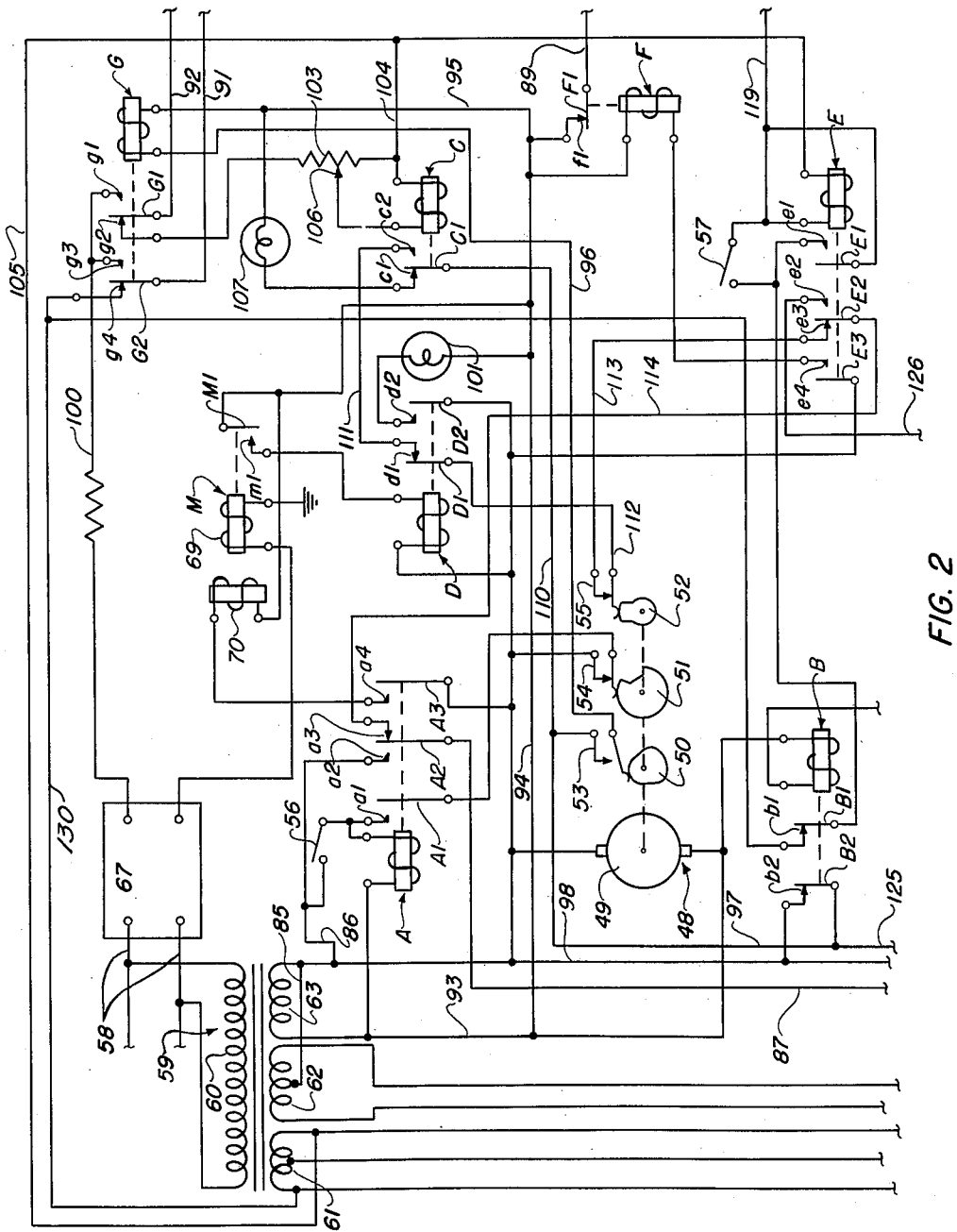
Figure 2 is another portion of the wiring diagram of Figure 1.

The continuity test circuit may comprise a suitable voltage supply (for example, secondary winding 61 of transformer 59), wire 130, contact g4, blade G2 of relay G in its de-energized condition, to test bus or wire 91, contact k3, blade K2 of the energized wire selector relay associated with the particular conductor under tests, thence through the connector J2 to the particular conductor under tests, through connector J1 to the blade K1, to contact k1 of the energized wire selector relay associated with the conductor under tests, to the test bus or wire 92, blade G1, contact g2 of the de-energized relay G, to the continuity fault detector shown in Fig. 2 as relay C and sensitivity adjusting control 103—106, wire 104 and wire 105 back to the voltage supply (secondary winding 61 of transformer 59).

From the foregoing those skilled in the art will observe that we have provided a system and arrangement whereby cables having multiple wires may be plugged into the system and very quickly tested for insulation resistance and continuity merely by pressing the start button of the instrument. The instrument makes it possible to test a large number of cables in a very short time without danger of overlooking any particular wire. The system provides for the necessary interruptions and indications in the event that a fault is discovered by the instrument in any individual wire.

The foregoing disclosure is representative of a preferred form of the invention and it is to be understood that various modifications, alterations and variations may be made by those skilled in the art without departing from the spirit and scope of the invention and it is accordingly intended that the boundaries of the invention shall be determined by the scope of the claims appended hereto.

I claim:

1. In an automatic test system for testing each of a plurality of wires in a cable comprising, in combination, means comprising a plurality of double pole double throw relays having their movable contacts connected to corresponding receptacles into which adaptors at the ends of the said cable may be plugged, one adjacent pair of each of said relay contacts being connected to a common bus and the other pair of adjacent contacts being connected to the movable contacts of a double pole double throw change-over relay, one pair of adjacent contacts of the change-over relay being connected in series with a source of relatively low voltage and the other pair of adjacent contacts of the change-over relay being connected together and to one terminal of a high voltage source, the other terminal of the high voltage source being connected to the aforesaid common bus, means including a timing device and switches operated thereby for connecting the said other pair of adjacent contacts of the change-over relay to the movable contacts of each of the first mentioned double pole double throw relays for a time interval during which the change-over relay is thrown from one position to its alternate position whereby each wire of the cable is checked for both continuity and insulation integrity.

2. The structure of claim 1 including a lock-out relay having an actuating coil in series with the high voltage source to disconnect at least one timing device switch to interrupt the testing procedure in the event of a fault in the wire, and a second relay having contacts in series with said at least one timing device switch, these contacts being normally open, and an actuating coil connected in series with the source of low voltage whereby insufficient current through the cable during the continuity test likewise interrupts the testing procedure.

3. Apparatus for testing each conductor of a multiconductor cable for electrical continuity and electrical isolation from other conductors comprising a first and a second receptacle each having an equal number of corresponding terminals, each pair of corresponding terminals being adapted to be connected in series with a conductor of said cable, a first two-pole double throw switch, hereinafter termed the wire selector switch, for each pair of corresponding terminals and having the movable contacts connected respectively to each pair of terminals, a first pair of adjacent switch contacts each connected respectively through a resistor to a common bus, and the other pair of adjacent switch contacts being connected to the movable contacts of a second double pole double throw switch, hereinafter termed the change-over switch, a source of high potential having one pole thereof connected to the common bus through a first alarm relay actuating coil and the other pole of said source of high potential being connected to a first two adjacent stationary contacts of said change-over switch, the second pair of adjacent contacts of the change-over switch being serially connected through the actuating coil of a second alarm relay to a source of low voltage electric current, said change-over switch second pair of adjacent contacts being normally engaged with the change-over switch movable contacts and the movable contacts of the wire-selector switch being normally in contact with the first pair of adjacent wire-selector contacts thereby normally connecting both ends of each cable conductor to the common bus, whereby under the condition of the wire-selector switch movable contacts being connected to the second pair of wire-selector switch stationary contacts, the source of low voltage electric current is connected in series with the second alarm actuating coil and the corresponding cable conductor to check the cable conductor for continuity; and when the change-over and wire-selector switches are thrown to their alternate pairs of contacts, a high voltage is impressed through the first alarm actuating coil on both ends of the corresponding conductor, all the other pairs of terminals remaining connected to the common bus to thereby check the cable conductor for insulation integrity.

4. The apparatus of claim 3 wherein each of said wire-selector switches includes an actuator coil, each of said actuator coils being connected in series with a corresponding switch point of a stepping switch, whereby the position of the stepping switch selectively inserts a corresponding conductor in the test circuit.

5. The apparatus of claim 4 in which said stepping switch has a spring actuator for advancing it one step at a time, an actuator coil for cocking said spring actuator, a pair of normally closed contacts with an armature for one of the contacts in proximity to said actuator coil; a timing motor, a first cam having a recess and mechanically coupled to said timing motor, a first cam switch hereinafter termed the cam synchronizing switch, having a cam follower riding on said first cam and being electrically closed except when the cam follower is in the cam recess, a starting relay having a triple pole switch and an actuator coil, a manual switch, said cam synchronizing switch having one contact connected to a first side of a voltage source, and the other contact connected to a first movable contact of said starting relay, the starting contact associated with said first movable contact of the starting relay being connected to one end of the starting relay actuator coil and to one contact of the manual switch, the other contact of the manual switch being connected to the said first side of a voltage source, and the other end of the starting relay actuator coil being connected to the other side of the said voltage source, a second cam coupled to said timing motor and having a lobe angularly displaced from the first cam recess, a second cam switch operatively related to the second cam, the second movable contact of the starting relay being double throw thereby having alternate first and second contacts with the second contact in continuity with the second movable contact when the starting actuator coil is not energized, a source of stepping relay actuator coil energizing potential connected in series with the stepping relay actuator coil and the second cam switch second contact whereby when the manual switch is momentarily closed the starting relay first switch is closed thereby starting a cycle by angular movement of the first cam closing the synchronizing cam switch thereby shunting the manual switch and upon rotation of the timing motor through a portion of a revolution the second cam switch closes thereby energizing the stepping switch actuator coil to cock the stepping switch spring, and upon further rotation of the timing motor the second cam switch opens thereby deactivating the stepping switch actuator coil to permit the spring to move the stepping switch through one position, and substantially simultaneously the first cam switch opens to deenergize the starting switch relay.

6. The apparatus of claim 5 including a third cam and third cam switch and circuit means including a source of potential, and said third cam switch connected to the change-over switch actuator coil to cyclically throw the change-over switch from the first position to the second position to automatically check both resistance and insulation integrity.

LOUIS J. KABELL.
RICHARD A. RICHARDS.
ALLEN L. DYER.

REFERENCES CITED

The following references are of record in the file of this patent:

UNITED STATES PATENTS

| Number | Name | Date |
|---|---|---|
| 2,459,801 | Fahrner | Jan. 25, 1949 |
| 2,524,141 | Rosenblum | Oct. 3, 1950 |
| 2,529,227 | Rosenblum | Nov. 7, 1950 |